US011965308B2

(12) United States Patent
Gilbeck et al.

(10) Patent No.: US 11,965,308 B2
(45) Date of Patent: Apr. 23, 2024

(54) SYSTEM AND METHOD OF TRUCK LOADING ASSISTANCE FOR WORK MACHINES

(71) Applicant: Deere & Company, Moline, IL (US)

(72) Inventors: Jon C. Gilbeck, Bettendorf, IA (US); Jonathan Spendlove, Bettendorf, IA (US); Zimin Vilar, Dubuque, IA (US)

(73) Assignee: Deere & Company, Moline, IL (US)

( * ) Notice: Subject to any disclaimer, the term of this patent is extended or adjusted under 35 U.S.C. 154(b) by 409 days.

(21) Appl. No.: 17/405,314

(22) Filed: Aug. 18, 2021

(65) Prior Publication Data
US 2022/0364323 A1 Nov. 17, 2022

Related U.S. Application Data

(60) Provisional application No. 63/187,809, filed on May 12, 2021.

(51) Int. Cl.
*E02F 3/43* (2006.01)
*B65G 67/04* (2006.01)
(Continued)

(52) U.S. Cl.
CPC .............. *E02F 3/439* (2013.01); *B65G 67/04* (2013.01); *E02F 3/32* (2013.01); *E02F 3/348* (2013.01)

(58) Field of Classification Search
CPC ........................... B65G 2201/045; B65G 67/04
See application file for complete search history.

(56) References Cited

U.S. PATENT DOCUMENTS

| 5,646,844 A | 7/1997 | Gudat et al. |
| 7,671,725 B2 | 3/2010 | Tsuji et al. |

(Continued)

FOREIGN PATENT DOCUMENTS

| DE | 19858401 A1 | 9/1999 |
| DE | 102019203300 A1 | 10/2019 |

(Continued)

OTHER PUBLICATIONS

German Search Report issued in application No. DE102022203042.7 dated Jan. 25, 2023 (10 pages).

*Primary Examiner* — Jaime Figueroa
*Assistant Examiner* — Jerrod Irvin Davis
(74) *Attorney, Agent, or Firm* — Gary L. Montle; Lucian Wayne Beavers; Patterson Intellectual Property Law, PC

(57) ABSTRACT

A system and method are provided for evenly distributing the loading of material in a loading container of a transport vehicle (e.g., articulated dump truck) by a work machine (e.g., excavator). At least one sensor mounted on the work machine generates data corresponding to at least a portion of the loading container. The captured data is processed to determine a current profile of material loaded in the loading container, wherein output signals are generated corresponding to a difference between the current profile and a predetermined target profile for the material loaded in the loading container. In certain embodiments, the output signals are used to assist an operator of the work machine with manual loading via an onboard display unit and superposed images associated with the current and/or target profiles. In other embodiments, the output signals automatically control at least part of the loading process.

20 Claims, 4 Drawing Sheets

(51) Int. Cl.
*E02F 3/32* (2006.01)
*E02F 3/348* (2006.01)

(56) References Cited

U.S. PATENT DOCUMENTS

| | | | |
|---|---|---|---|
| 7,949,449 | B2 | 5/2011 | Koch et al. |
| 8,626,406 | B2 | 1/2014 | Schleicher et al. |
| 8,843,311 | B2 | 9/2014 | Takeda |
| 8,954,252 | B1 | 2/2015 | Urmson et al. |
| 9,221,659 | B2 | 12/2015 | Fukasu et al. |
| 9,415,935 | B1 | 8/2016 | Macfarlane |
| 9,567,731 | B2 | 2/2017 | Darukhanavala et al. |
| 9,712,791 | B2 | 7/2017 | Kim et al. |
| 9,908,385 | B2 | 3/2018 | Chundrlik, Jr. et al. |
| 9,946,451 | B2 | 4/2018 | Kim et al. |
| 10,479,354 | B2 | 11/2019 | Posselius et al. |
| 10,662,613 | B2 | 5/2020 | Ready-Campbell et al. |
| 10,801,177 | B2 | 10/2020 | Ready-Campbell et al. |
| 10,968,602 | B2 | 4/2021 | Hendricks |
| 2013/0046525 | A1 | 2/2013 | Ali et al. |
| 2015/0189216 | A1 | 7/2015 | Fukuchi et al. |
| 2016/0048783 | A1* | 2/2016 | Peterson ............... G06F 3/048 705/7.13 |
| 2017/0037593 | A1 | 2/2017 | Naik et al. |
| 2017/0131722 | A1 | 5/2017 | Hiramatsu et al. |
| 2017/0135277 | A1 | 5/2017 | Hiramatsu et al. |
| 2018/0035050 | A1 | 2/2018 | Lu et al. |
| 2018/0179732 | A1 | 6/2018 | Bartsch et al. |
| 2018/0210454 | A1 | 7/2018 | Ready-Campbell et al. |
| 2020/0238881 | A1 | 7/2020 | Hendricks |
| 2022/0340171 | A1* | 10/2022 | Halder ............ B60W 60/0025 |

FOREIGN PATENT DOCUMENTS

| | | |
|---|---|---|
| DE | 112019003049 T5 | 3/2021 |
| GB | 2342640 A | 4/2000 |
| WO | 2014166331 A1 | 10/2014 |
| WO | WO2017184037 A1 | 10/2017 |
| WO | 2018021321 A1 | 2/2018 |

\* cited by examiner

SYSTEM AND METHOD OF TRUCK LOADING ASSISTANCE FOR WORK MACHINES

FIELD OF THE DISCLOSURE

The present disclosure relates generally to work machines for loading material on transport vehicles such as articulated dump trucks, and more particularly to systems and methods for real-time assistance in the loading process for material load distribution.

BACKGROUND

Work machines as discussed herein may particularly refer to excavator machines for illustrative purposes, but may also for example include various other machines and equipment, self-propelled or otherwise, which modify the terrain or equivalent working environment in some way, and further are responsible for loading material from the proximate terrain into transport vehicles for delivery to a separate dumping site. Tracked or wheeled ground engaging units support an undercarriage from the ground surface, and the undercarriage may typically further support one or more work implements (also or otherwise referred to in some contexts as attachments or linkage assemblies) which are used to dig or otherwise extract material from the terrain and to selectively discharge the material into a loading area associated with the transport vehicles, such as for example the container of an articulated dump truck.

One conventional technique for easing the loading process is to load the transport vehicle from an elevated position, referred to as bench loading. However, a majority of the time such an arrangement is impractical. When the work machine is accordingly required to load the transport vehicle from an equivalent position (e.g., both on flat ground), visibility for the operator of the work machine into the loading container (e.g., truck bin) is substantially limited.

Expert operators in such arrangements are still typically able to spread the load, substantially balancing the material distribution into the loading container from front to back and from side to side during the loading process. However, there is little to nothing available in conventional systems for assisting in this process, a problem that is particularly meaningful when the loading process is performed using relatively inexperienced operators. Payload weighing systems are well known in the art for transport vehicles such as articulated dump trucks, but these systems only provide a single point measurement and are unable to effectively represent variances in weight distribution throughout the loading container.

BRIEF SUMMARY

The current disclosure provides an enhancement to conventional systems, at least in part by introducing a novel system and method for scanning the contents of a loading container and providing operator assistance, for example showing the operator which side of the loading container is relatively light or heavy. Various embodiments of such a system and method as disclosed herein accordingly ensure that the transport vehicle is full and the material is spread evenly, addressing known visibility and real-time feedback deficiencies in the conventional applications.

In one embodiment, a method as disclosed herein is provided for assisting in material loading distribution in a loading container of a transport vehicle (e.g., articulated dump truck) by a work machine (e.g., excavator) having at least one material loading work implement. For example, said work implement may be configured to swing about a vertical axis relative to an undercarriage of the work machine. At least one sensor mounted on the work machine generates data corresponding to at least a portion of the loading container. Exemplary data from such a sensor may include digital images generated from an appropriately positioned stereo camera, and in some embodiments may for example include data for generating a point cloud from a high-resolution mapping radar sensor or the like. A current profile of material loaded in the loading container is determined using at least the captured data, and output signals are generated corresponding to a difference between the current profile and a predetermined target profile for the material loaded in the loading container.

In one exemplary aspect according to the above-referenced embodiment, the output signals may be generated to a display unit to display indicia corresponding to the current profile and the predetermined target profile. A displayed image on the display unit may for example comprise a first image layer corresponding to images of the loading container captured via one or more of the at least one sensor and further comprises a second image layer superposed with respect to the first image layer and comprising the indicia corresponding to the current profile and the predetermined target profile. The displayed image may include indicia in a single dimension and/or may for example include a two-dimensional topographical map depending on a relative location of the sensor.

In another exemplary aspect according to the above-referenced embodiment, the output signals may be generated to a display unit to display indicia recommending a material discharge location or track in the loading container. The recommended discharge location or track in the loading container may for example be determined at least in part based on a stored loading program.

In another exemplary aspect according to the above-referenced embodiment, the method may include dynamically highlighting portions of a displayed image on the display unit based on the recommended discharge location or track in the loading container and further based on a detected current position of at least a portion of the work implement.

In another exemplary aspect according to the above-referenced embodiment, the stored loading program may be selectively retrieved for a loading operation based on detected parameters associated with one or more of the loading container, the transport vehicle, and the material being loaded.

In another exemplary aspect according to the above-referenced embodiment, the output signals may be generated to automatically control at least a portion of the loading process. Control data for the at least a portion of the loading process may for example be selectively retrieved from data storage based on detected parameters associated with one or more of the loading container, the transport vehicle, and the material being loaded.

In another exemplary aspect according to the above-referenced embodiment, the method may include detecting relative positions and/or distances with respect to one or more points of the loading container based on received signals from the transport vehicle, and implementing the detected relative positions and/or distances for the determining the current profile of material loaded in the loading container.

In another embodiment as disclosed herein, a system is provided for assisting in material loading in accordance with the above-referenced method embodiment and optionally the further referenced exemplary aspects.

The system may for example include a controller associated with the work machine which receives data from at least the sensor and directs performance of operations according to the method embodiment and optional aspects.

The system may alternatively include a remote computing device, alone or in functional communication with an onboard controller for the work machine, which receives data from at least the sensor and directs performance of operations according to the method embodiment and optional aspects.

Numerous objects, features and advantages of the embodiments set forth herein will be readily apparent to those skilled in the art upon reading of the following disclosure when taken in conjunction with the accompanying drawings.

DETAILED DESCRIPTION

Referring now to FIGS. 1-6, various embodiments may now be described of an inventive system and method.

Figure 1:
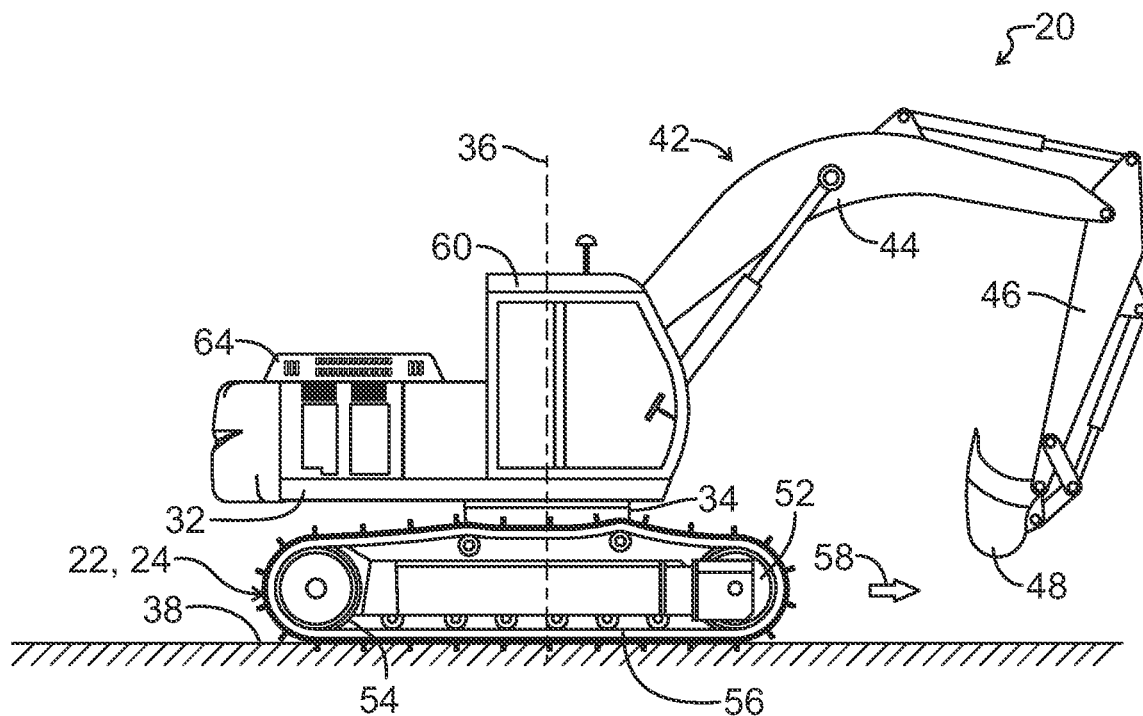
FIG. 1 is a perspective view representing an exemplary work machine according to the present disclosure.

FIG. 1 in a particular embodiment as disclosed herein shows a representative work machine 20 in the form of, for example, a tracked excavator machine. The work machine 20 includes an undercarriage 22 with first and second ground engaging units 24 driven by first and second travel motors (not shown), respectively.

A main frame 32 is supported from the undercarriage 22 by a swing bearing 34 such that the main frame 32 is pivotable about a pivot axis 36 relative to the undercarriage 22. The pivot axis 36 is substantially vertical when a ground surface 38 engaged by the ground engaging units 24 is substantially horizontal. A swing motor (not shown) is configured to pivot the main frame 32 on the swing bearing 34 about the pivot axis 36 relative to the undercarriage 22.

A work implement 42 in the context of the referenced work machine 20 includes a boom assembly with a boom 44, an arm 46 pivotally connected to the boom 44, and a working tool 48. The term "implement" may be used herein to describe the boom assembly (or equivalent thereof) collectively, or individual elements of the boom assembly or equivalent thereof. The boom 44 is pivotally attached to the main frame 32 to pivot about a generally horizontal axis relative to the main frame 32. The working tool in this embodiment is an excavator shovel (or bucket) 48 which is pivotally connected to the arm 46. The boom assembly extends from the main frame 32 along a working direction of the boom assembly 42. The working direction can also be described as a working direction of the boom 44. As described herein, control of the work implement 42 may relate to control of any one or more of the associated components (e.g., boom 44, arm 46, tool 48).

It is within the scope of the present disclosure that the work machine 20 may take various alternative forms and further utilize alternative work implements 42 to modify the proximate terrain.

In the embodiment of FIG. 1, the first and second ground engaging units 24 are tracked ground engaging units, although various alternative embodiments of a work machine 20 are contemplated wherein the ground engaging units 24 may be wheeled ground engaging units. Each of the tracked ground engaging units 24 includes an idler 52, a drive sprocket 54, and a track chain 56 extending around the idler 52 and the drive sprocket 54. The travel motor of each tracked ground engaging unit 24 drives its respective drive sprocket 54. Each tracked ground engaging unit 24 is represented as having a forward traveling direction 58 defined from the drive sprocket 54 toward the idler 52. The forward traveling direction 58 of the tracked ground engaging units 24 also defines a forward traveling direction 58 of the undercarriage 22 and thus of the work machine 20. In some applications, including uphill travel as further discussed below, the orientation of the undercarriage 22 may be reversed such that a traveling direction of the work machine 20 is defined from the idler 52 toward its respective drive sprocket 54, whereas the work implement(s) 42 is still positioned ahead of the undercarriage 22 in the traveling direction.

Although an excavator as the work machine 20 may be self-propelled in accordance with the above-referenced elements, other forms of work machines 20 may be contemplated within the scope of the present disclosure that are not self-propelled, unless otherwise specifically noted.

An operator's cab 60 may be located on the main frame 32. The operator's cab 60 and the work implement 42 (e.g., boom assembly) may both be mounted on the main frame 32 so that the operator's cab 60 faces in the working direction 58 of the boom assembly. A control station (not shown) may be located in the operator's cab 60. The control station may include or otherwise be associated with a user interface as further described below. As used herein, directions with regard to work machine 20 may be referred to from the perspective of an operator seated within the operator cab 60; the left of the work machine is to the left of such an operator, the right of the work machine is to the right of such an operator, a front-end portion (or fore) of the work machine is the direction such an operator faces, a rear-end portion (or aft) of the work machine is behind such an operator, a top of the work machine is above such an operator, and a bottom of the work machine below such an operator.

Also mounted on the main frame 32 is an engine 64 for powering the work machine 20. The engine 64 may be a diesel internal combustion engine, but is not so limited and within the scope of the present disclosure the work machine 20 may alternatively be driven by a non-combustion power source (not shown). The engine 64 may drive a hydraulic pump to provide hydraulic power to the various operating systems of the work machine 20.

Figure 2:
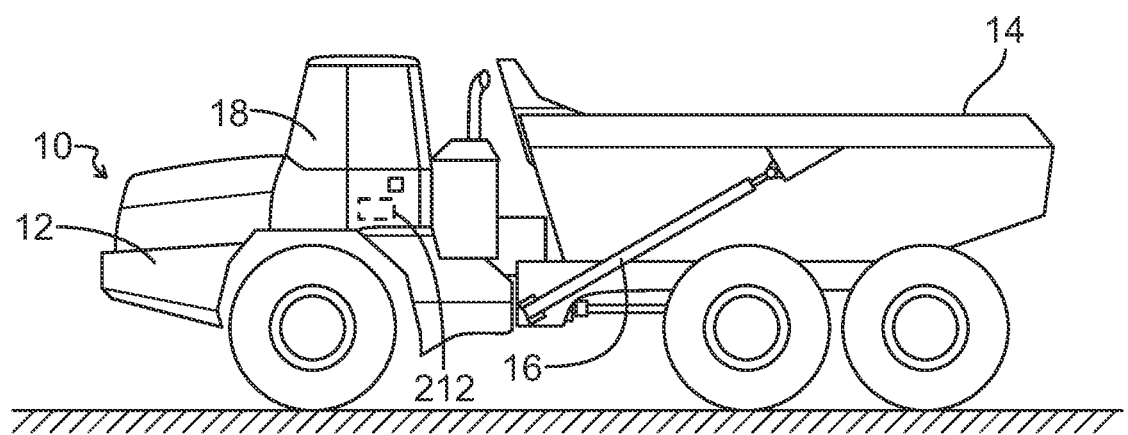
FIG. 2 is a perspective view representing an exemplary transport vehicle according to the present disclosure.

An articulated dump truck as representing a transport vehicle 10 in FIG. 2 may include a plurality of wheels and associated axles, and a frame 12 supporting a loading container 14 (e.g., truck bed) having for example a loading surface at the bottom of an interior area surrounded by sidewalls, and a top edge at least part of which may typically be in parallel with the ground surface. A hydraulic piston-cylinder unit 16 may be coupled between the frame 12 and the loading container 14 and configured to selectively extend and raise/pivot the loading container 14 rearward to a dumping position, and to retract and lower/pivot the loading container 14 forward from the dumping position to a travel and loading position (as shown). An operator's cab 18 of the transport vehicle 10 may be located on the frame 12, wherein directions with regard to the transport vehicle 10 may be referred to from the perspective of an operator seated within the operator cab 18; the left of the transport vehicle is to the left of such an operator, the right of the transport vehicle is to the right of such an operator, a front-end portion (or fore) of the transport vehicle is the direction such an operator faces, a rear-end portion (or aft) of the transport vehicle is behind such an operator, a top of the transport vehicle is above such an operator, and a bottom of the transport vehicle below such an operator.

Figure 3:
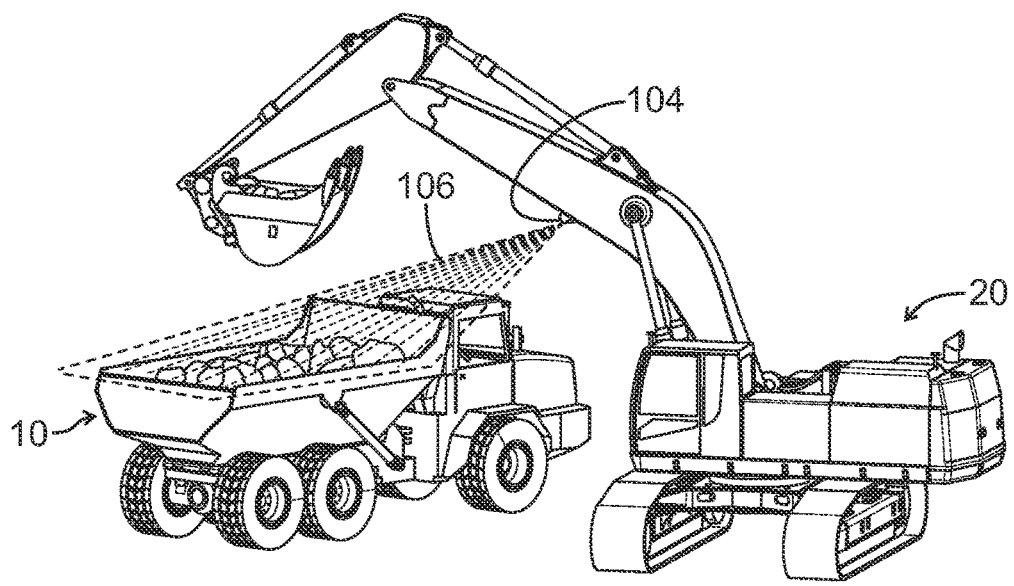
FIG. 3 is a perspective view representing a sensor located on the work machine of FIG. 1, scanning a profile of material loaded on the transport vehicle of FIG. 2.

Referring next to FIG. 3, a sensor 104 (not shown in FIG. 1) such as for example but not limited thereto a stereo camera may be mounted on the work machine 20 in accordance with the present disclosure. The location of the sensor 104 may be chosen such that a field of view 106 encompasses the loading container 14 of the transport vehicle 10 during at least a portion of a material loading operation as a first work state wherein the surface of the loading container 14 is retracted into a substantially horizontal orientation as shown, and may preferably be chosen such that the field of view 106 encompasses all four top edges of the loading container 14. As represented in FIG. 3, the work machine 20 is on the same level relative to the transport vehicle 10, but it may be appreciated that in various loading applications the work machine 20 may be in an elevated position relative to the transport vehicle 10 and/or at various respective orientations relative to each other. In some embodiments, a plurality of sensors 104 or a sensor 104 that is moveable or reconfigurable in position may be provided to account for the differences in potential relative elevations, positions, and orientations with respect to a transport vehicle during loading.

Figure 4:
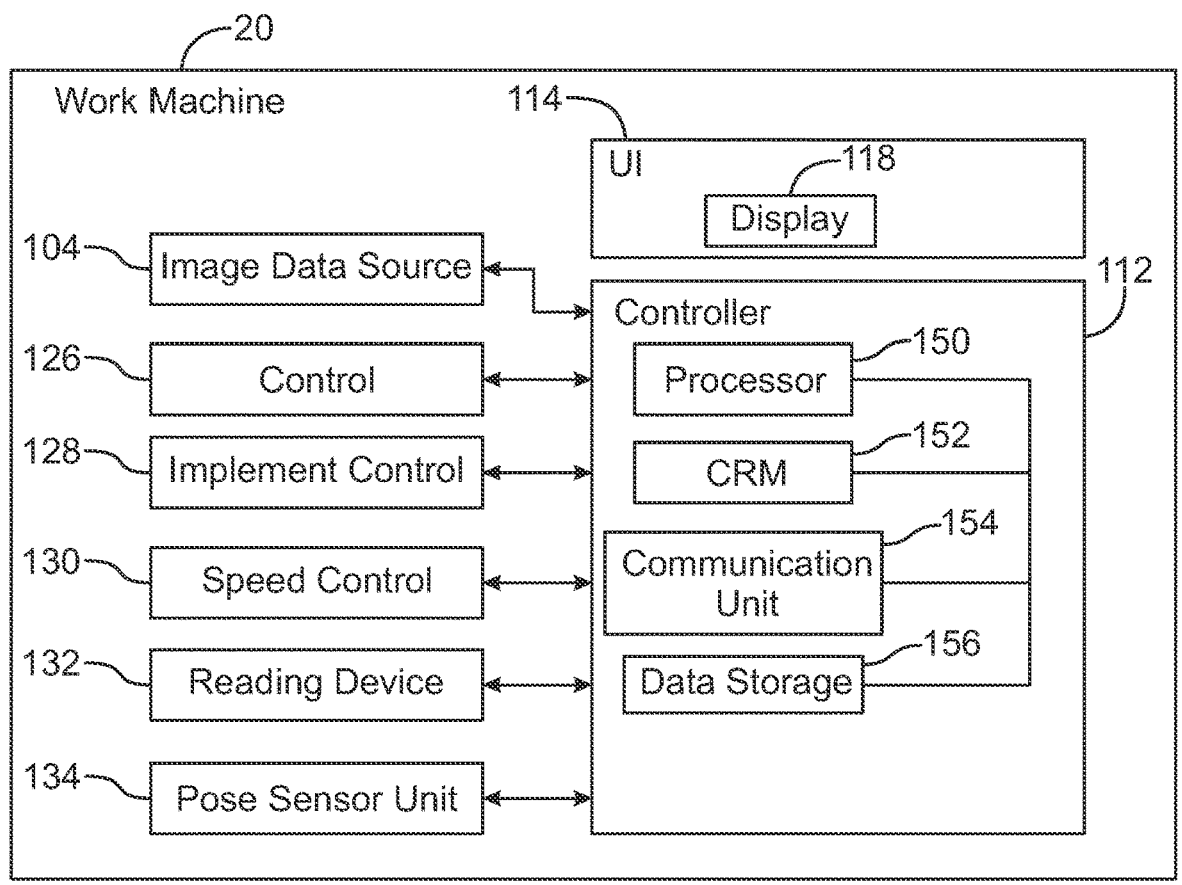
FIG. 4 is a block diagram representing a control system for the work machine according to an embodiment of the present disclosure.

As schematically illustrated in FIG. 4, the work machine 20 includes a control system including a controller 112. The controller 112 may be part of the machine control system of the work machine 20, or it may be a separate control module.

As referenced above, the controller 112 is configured to receive input signals from some or all of various sensors 104 such as for example cameras which may collectively define an imaging system. The sensors 104 may include video cameras configured to record an original image stream and transmit corresponding data to the controller 112. In the alternative or in addition, the sensors 104 may include one or more of an infrared camera, a stereoscopic camera, a PMD camera, or the like. One of skill in the art may appreciate that high resolution light detection and ranging (LiDAR) scanners, radar detectors, laser scanners, and the like may be implemented as sensors 104 within the scope of the present disclosure. The number and orientation of said sensors 104 may vary in accordance with the type of work machine 20 and relevant applications, but may at least be provided with respect to an area in a travelling direction of the work machine 20 and configured to capture data (e.g., images, point clouds, etc.) associated with a loading area proximate the work machine 20 such as the loading container 14.

The position and size of an image region recorded by a respective camera as a sensor 104 may depend on the arrangement and orientation of the camera and the camera lens system, in particular the focal length of the lens of the camera, but may desirably be configured to capture substantially the entire loading area such as for example associated with the loading container 14 throughout a loading operation. One of skill in the art may further appreciate that image data processing functions may be performed discretely at a given sensor 104 if properly configured, but also or otherwise may generally include at least some image data processing by the controller or other downstream data processor. For example, image data from any one or more sensors 104 may be provided for three-dimensional point cloud generation, image segmentation, object delineation and classification, and the like, using image data processing tools as are known in the art in combination with the objectives disclosed.

The controller 112 of the work machine 20 may be configured to produce outputs, as further described below, to a user interface 114 associated with a display unit 118 for display to the human operator. The controller 112 may be configured to receive inputs from the user interface 114, such as user input provided via the user interface 114. Not specifically represented in FIG. 5, the controller 112 of the work machine 20 may in some embodiments further receive inputs from and generate outputs to remote devices associated with a user via a respective user interface, for example a display unit with touchscreen interface. Data transmission between for example the vehicle control system and a remote user interface may take the form of a wireless communications system and associated components as are conventionally known in the art. In certain embodiments, a remote user interface and vehicle control systems for respective work machines 20 may be further coordinated or otherwise interact with a remote server or other computing device for the performance of operations in a system as disclosed herein.

The controller 112 may in various embodiments be configured to generate control signals for controlling the operation of respective actuators, or signals for indirect control via intermediate control units, associated with a machine steering control system 126, a machine implement control system 128, and an engine speed control system 130. The control systems 126, 128, 130 may be independent or otherwise integrated together or as part of a machine control unit in various manners as known in the art. The controller 112 may for example generate control signals for controlling the operation of various actuators, such as hydraulic motors or hydraulic piston-cylinder units (not shown), and electronic control signals from the controller 112 may actually be received by electro-hydraulic control valves associated with the actuators such that the electro-hydraulic control valves will control the flow of hydraulic fluid to and from the respective hydraulic actuators to control the actuation thereof in response to the control signal from the controller 112.

A reading device 132 as conventionally known in the art such as for example an RFID device, barcode scanner, or the like may further be provided and communicatively linked to the controller 112 for obtaining readable information associated with a particular transport vehicle 10.

The controller 112 includes or may be associated with a processor 150, a computer readable medium 152, a communication unit 154, and data storage 156 such as for example a database network. It is understood that the controller 112 described herein may be a single controller having some or all of the described functionality, or it may include multiple controllers wherein some or all of the described functionality is distributed among the multiple controllers.

Various operations, steps or algorithms as described in connection with the controller 112 can be embodied directly in hardware, in a computer program product such as a software module executed by the processor 150, or in a combination of the two. The computer program product can reside in RAM memory, flash memory, ROM memory, EPROM memory, EEPROM memory, registers, hard disk, a removable disk, or any other form of computer-readable medium 152 known in the art. An exemplary computer-readable medium 152 can be coupled to the processor 150 such that the processor 150 can read information from, and write information to, the memory/storage medium 156. In the alternative, the medium 152 can be integral to the processor 150. The processor 150 and the medium 152 can reside in an application specific integrated circuit (ASIC). The ASIC can reside in a user terminal. In the alternative, the processor 150 and the medium 152 can reside as discrete components in a user terminal.

The term "processor" 150 as used herein may refer to at least general-purpose or specific-purpose processing devices and/or logic as may be understood by one of skill in the art, including but not limited to a microprocessor, a microcontroller, a state machine, and the like. A processor 150 can also be implemented as a combination of computing devices, e.g., a combination of a DSP and a microprocessor, a plurality of microprocessors, one or more microprocessors in conjunction with a DSP core, or any other such configuration.

The communication unit 154 may support or provide communications between the controller 112 and external communications units, systems, or devices, and/or support or provide communication interface with respect to internal components of the work machine 20. The communications unit may include wireless communication system components (e.g., via cellular modem, WiFi, Bluetooth or the like) and/or may include one or more wired communications terminals such as universal serial bus ports.

The data storage 156 as further described below may, unless otherwise stated, generally encompass hardware such as volatile or non-volatile storage devices, drives, electronic memory, and optical or other storage media, as well as in certain embodiments one or more databases residing thereon.

Figure 5:
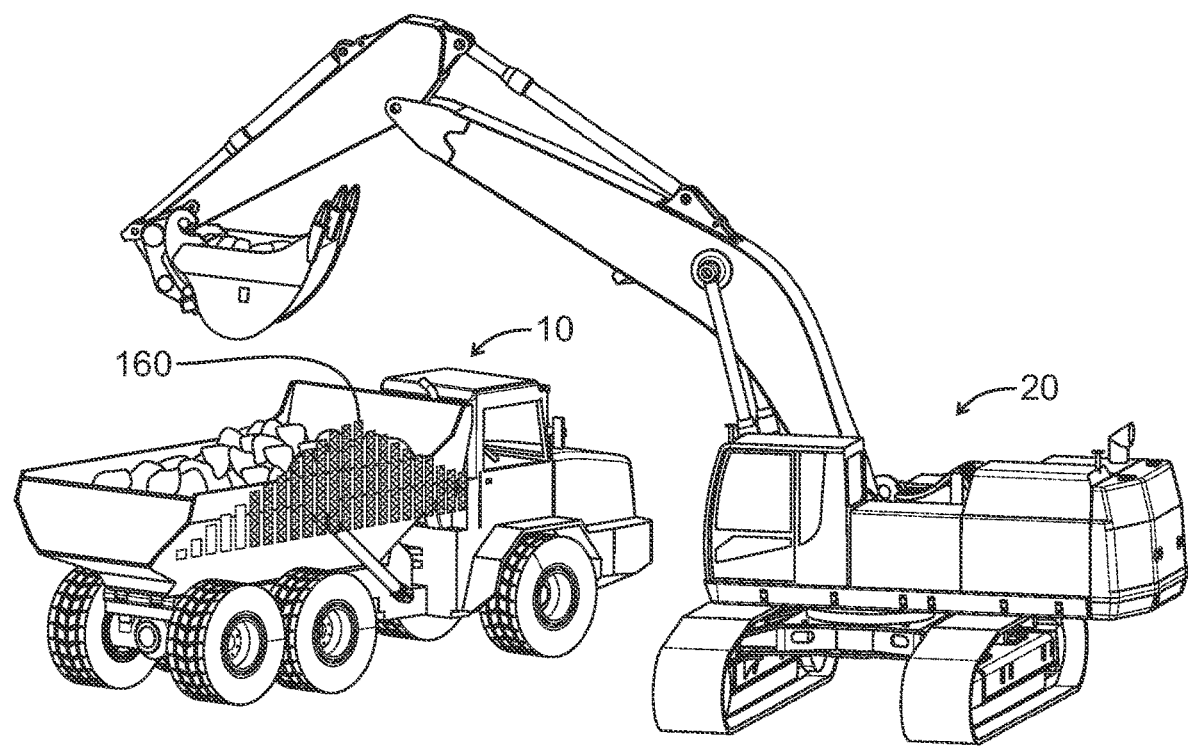
FIG. 5 is the perspective view of FIG. 3, further representing an exemplary visual model for displaying a profile of the loaded material.
Figure 6:
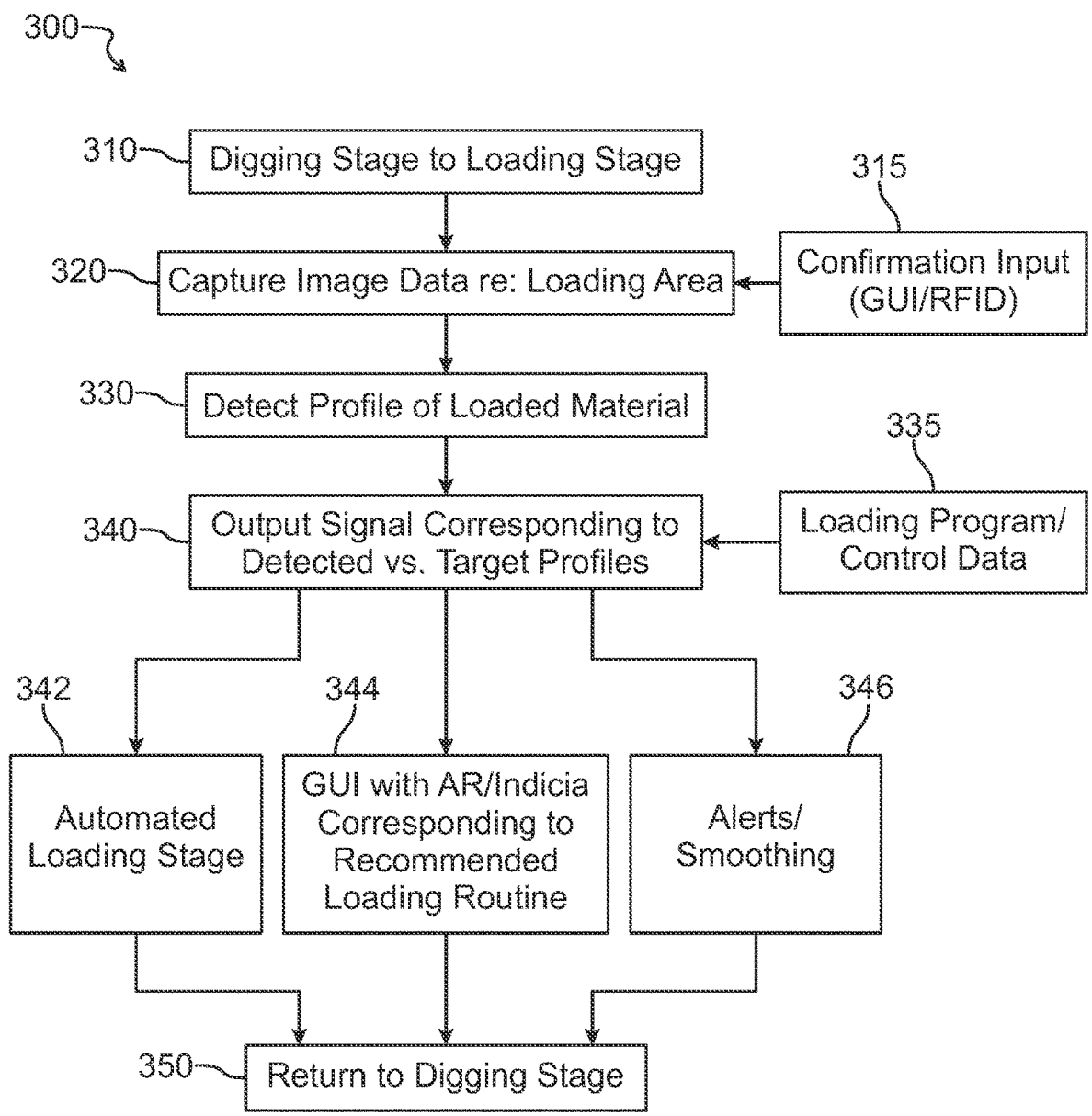
FIG. 6 is a flowchart representing an exemplary method according to an embodiment of the present disclosure.

Referring next to FIG. 6, with further illustrative reference back to FIGS. 1-5, an embodiment of a method 300 may now be described which is exemplary but not limiting on the scope the present disclosure unless otherwise specifically noted. One of skill in the art may appreciate that alternative embodiments may include fewer or additional steps, and that certain disclosed steps may for example be performed in different chronological order or simultaneously. Unless otherwise specifically noted, operations, steps, functions, processes, and the like as disclosed in association with the method 300 may be executed or directed by a single computing device, or via multiple computing devices in operable communication via a communications network. Exemplary such computing devices may include onboard controllers or machine control systems, remote servers, mobile user devices, and the like.

The method 300 may begin upon a transition of the work machine 20 from a digging stage to a loading stage, or otherwise stated upon initiation of a loading stage when a transport vehicle 10 is determined to be properly positioned relative to the work machine 20 (step 310). In some embodiments this may involve a user input to initiate subsequent steps, or an automatic detection of surrounding conditions using work machine-mounted sensors, but this step may also be omitted in other embodiments.

The method 300 may continue in step 320 by capturing image data comprising loaded material in the loading container 14 via the sensor(s) 104 mounted on the work machine 20. In an embodiment, a sensor 104 is preferably mounted on the side or underside of the boom (or equivalent work implement 42) to provide a desired field of view 106 (see, e.g., FIG. 3) relative to the loading container 14 during the loading process itself, but alternative or additional locations for sensors 104 may be contemplated within the scope of the present disclosure. For example, a sensor 104 (or an additional sensor of a set of such data sources) may in certain embodiments be mounted on an arm coupled to the boom, or proximate to a bucket at a distal end of a boom assembly, etc.

In various embodiments, the scanned image data may be analyzed to detect a profile of the loaded material (step 330), for example using for example three-dimensional point cloud generation, image segmentation, object delineation and classification, and the like, using image data processing tools as are known in the art, further optionally in view of confirmation inputs (step 315) which may be provided to assist in image processing and recognition. For example, user input may be provided via a user interface in response to system-initiated prompts to confirm one or more elements of a captured image, or to proactively identify one or more elements of the captured image as a relevant portion of the loading container 14 or loaded material. In another example, a radio frequency identification (RFID) system associated with the work machine 20 and the transport vehicle 10 may provide signals corresponding to relative distances between two defined points and thereby also provide confirmation inputs for the image processing system as needed.

Contemplated image processing techniques within the scope of the present disclosure may further utilize a stored reference profile corresponding to predetermined contours of the loading container 14. The contours of the loading container 14 may be determined dynamically using the sensor, or a reference profile may be predetermined and retrieved from data storage upon identifying the particular transport vehicle or type of transport vehicle, or may be input directly from the user interface, etc.

Upon detecting a profile of the loaded material, the method 300 may selectively generate output signals corresponding to the detected profile relative to or based on a comparison with a predetermined target profile for the loaded material (step 340). In certain embodiments, the controller 112 of the work machine 20 may be configured to selectively retrieve control data or stored information from a loading program (step 335), for example in view of current parameters such as for example a type of material being loaded, a configuration of the loading container 14, a type of transport vehicle, or the like, any one or more of which may influence the target profile or a desired loading sequence for obtaining the target profile.

In an embodiment, the output signals may be provided for automated loading of at least a portion of the loading process (step 342). For example, stored control data may be retrieved and implemented to direct movements of the boom 44 with respect to the loading container 14 and desired points of impingement for the material being dumped, and/or movements of the working tool 48 (e.g., bucket) to cause material carried therein to be dumped in association the desired points of impingement. The stored control data may be predetermined with respect to, e.g., a given type of transport vehicle, or may be developed/learned over time for a particular work machine/work implement combination and with respect to different parameters including for example a type of material being loaded, a configuration of the loading container 14, a type of transport vehicle, or the like, any one or more of which may influence the target profile or a desired loading sequence for obtaining the target profile. In some embodiments, the output signals for automated distribution control may cause the work tool (e.g., bucket) to simply smooth an existing profile of the loaded material after dumping, in addition to or as opposed to automated control of the dumping step itself.

In an embodiment, the output signals may be provided for visual operator assistance in a manual loading process (step 344), for example to generate displayed images on an onboard user interface with display unit. Such displayed images may include various forms of visual indicia (e.g., text, images, colors) to indicate a recommended loading routine, a recommended point of impingement for the material to be dumped, or the like. For example, the output signals may cause dynamic highlighting of portions of a displayed image on the display unit based on the recommended material discharge location or track in the loading container 14 and further based on a detected current position of at least a portion of the work implement. Such displayed images may include a first image layer which corresponds with captured images of the loading container 14 and a second image layer which is overlaid or superposed with respect to the loading container 14 and further represents a current profile of the loaded material and/or a target profile of the loaded material. As shown in FIG. 5, for example, a superposed image 160 may generally represent the current profile of the loaded material but further include colored portions thereof to distinguish portions that are relatively heavy from portions that are relatively light.

The scope of the present disclosure is not limited to the examples described above and illustrated in the accompanying figures, as for example portions of the display unit may separately display captured images of the loading container 14 and/or render indicia associated with the current profile of the loaded material and/or a target profile of the loaded material. The display unit may be configured to create a single image layer including a graphical representation 160 of the loading container 14 and the relevant indicia.

The generated indicia are not limited to one-dimensional indexes but may further within the scope of the present disclosure include further examples of graphical representations 160 including heat maps, multi-dimensional topographical elements or contour representations, and the like. The generated indicia may include superposed augmented reality layers 160, as previously noted, but may further or in the alternative include a single virtual reality layer 160 corresponding to the loading container area and the current and/or target profiles, or may relate to an individual equalizer bar, a heat map, or other simple iconography 160 to represent either or both of the respective current and target profiles.

In certain embodiments a format of the display may be dependent on one or more conditions such as a viewing angle from the work machine 20 with respect to the loading container 14. For example, in one context the system may determine that a top-down view of the loading container 14 is preferably displayed along with a heat map rendered therein corresponding to differences between the current profile of the loaded material and the target profile of the loaded material. In another context the system may determine that a perspective view of the loading container 14 is preferably displayed along with a topographical representation of the current profile of the loaded material and/or the target profile of the loaded material. Such determinations may for example be made dynamically by the system and implemented automatically based on current conditions such as viewing angles, or may be selected manually by the operator using a user interface tool therefor.

In an embodiment, the output signals may be provided for alternative forms of operator assistance in a manual loading process (step 346), for example to audibly, visually, or audio-visually indicate desired dumping tracks or individual points of impingement corresponding to a loading program, or corresponding to detected areas in the loading container 14 where the current profile of loaded material is relatively heavy or relative light. Such assistance may take the form of alerts to indicate whether the dumping process is proceeding according to the loading program or other distribution parameters, or may include one or more lights which selectively engage depending on, e.g., a position of the bucket relative to heavy or light portions of the current material profile.

After the material has been dumped into the loading container 14, the method 300 may optionally suspend the capturing and processing of image data (step 350) while the work implement 42 returns to the digging stage, and restart the method 300 at step 310 when the work implement 42 is ready to approach the transport vehicle 10 with another load.

As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item B and item C.

One of skill in the art may appreciate that when an element herein is referred to as being "coupled" to another element, it can be directly connected to the other element or intervening elements may be present.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A method of distributed loading of material in a loading container of a transport vehicle by a work machine having at least one material loading work implement, the method comprising:

capturing, via at least one sensor mounted on the work machine and having a field of view oriented at least partially away there from, data corresponding to at least a portion of the loading container;

determining, via at least the captured data from the at least one sensor, a current profile of material loaded in the loading container; and generating output signals corresponding to a difference between the current profile and a predetermined target profile for the material loaded in the loading container, wherein the output signals comprise output signals generated to automatically control at least a portion of a loading process, and wherein the output signals comprise output signals generated to a display unit to display indicia corresponding to the current profile and the predetermined target profile, wherein a displayed image on the display unit comprises a first image layer corresponding to images of the loading container captured via one or more of the at least one sensor and further comprises a second image layer superposed with respect to the first image layer and comprising the indicia corresponding to the current profile and the predetermined target profile.

2. The method of claim 1, wherein the indicia corresponding to the current profile and the predetermined target profile comprises a multi-dimensional graphical representation.

3. The method of claim 1, wherein the output signals comprise output signals generated to the display unit to display indicia recommending a material discharge location or track in the loading container.

4. The method of claim 3, wherein the recommended material discharge location or track in the loading container is determined at least in part based on a stored loading program.

5. The method of claim 4, further comprising dynamically highlighting portions of a displayed image on the display unit based on the recommended material discharge location or track in the loading container and further based on a detected current position of at least a portion of the material loading work implement.

6. The method of claim 4, wherein the stored loading program is selectively retrieved for a loading operation based on detected parameters associated with one or more of the loading container, the transport vehicle, and the material being loaded.

7. The method of claim 1, wherein control data for the at least a portion of the loading process are selectively retrieved from data storage based on detected parameters associated with one or more of the loading container, the transport vehicle, and the material being loaded.

8. The method of claim 1, further comprising detecting relative positions and/or distances with respect to one or more points of the loading container based on received signals from the transport vehicle, and implementing the detected relative positions and/or distances for the determining the current profile of material loaded in the loading container.

9. A work machine comprising:
a frame supported by a plurality of ground engaging units;
at least one work implement supported from the frame;
at least one sensor mounted on the work machine and having a field of view oriented at least partially away there from, wherein the at least one sensor is configured to generate data corresponding to at least a portion of a loading container during a loading state of the work machine;
an onboard display unit; and
a controller configured to
determine, via at least the generated data, a current profile of material loaded in the loading container, and
generate output signals corresponding to a difference between the current profile and a predetermined target profile for the material loaded in the loading container,
wherein the output signals comprise output signals generated to automatically control at least a portion of a loading process, and
wherein the output signals comprise output signals generated to the onboard display unit to display indicia corresponding to the current profile and the predetermined target profile, and wherein a displayed image on the onboard display unit comprises a first image layer corresponding to images of the loading container captured via one or more of the at least one sensor and further comprises a second image layer superposed with respect to the first image layer and comprising the indicia corresponding to the current profile and the predetermined target profile.

10. The work machine of claim 9, wherein the output signals comprise output signals generated to the onboard display unit to display indicia recommending a material discharge location or track in the loading container.

11. The work machine of claim 10, further comprising data storage associated with the controller and having a loading program stored thereon, wherein the recommended material discharge location or track in the loading container is determined at least in part based on the stored loading program.

12. The work machine of claim 11, wherein the controller is configured to dynamically highlight portions of a displayed image on the onboard display unit based on the recommended material discharge location or track in the loading container and further based on a detected current position of at least a portion of the work implement.

13. A method of distributed loading of material in a loading container of a transport vehicle by a work machine having at least one material loading work implement, the method comprising:
capturing, via at least one sensor mounted on the work machine and having a field of view oriented at least partially away there from, data corresponding to at least a portion of the loading container;
determining, via at least the captured data from the at least one sensor, a current profile of material loaded in the loading container; and
generating output signals corresponding to a difference between the current profile and a predetermined target profile for the material loaded in the loading container,
wherein the output signals comprise output signals generated to automatically control at least a portion of a loading process, and
wherein the output signals comprise output signals generated to a display unit to display indicia corresponding to the current profile and the predetermined target profile, wherein a first portion of the display unit displays a first image layer corresponding to images of the loading container captured via one or more of the at least one sensor and a second portion of the display unit comprises the indicia corresponding to the current profile and the pre determined tar get profile.

14. The method of claim 13, wherein the output signals comprise output signals generated to the display unit to display indicia recommending a material discharge location or track in the loading container.

15. The method of claim 14, wherein the recommended material discharge location or track in the loading container is determined at least in part based on a stored loading program.

16. The method of claim 15, further comprising dynamically highlighting portions of a displayed image on the display unit based on the recommended material discharge location or track in the loading container and further based on a detected current position of at least a portion of the material loading work implement.

17. The method of claim 15, wherein the stored loading program is selectively retrieved for a loading operation based on detected parameters associated with one or more of the loading container, the transport vehicle, and the material being loaded.

18. The method of claim 13, wherein control data for the at least a portion of the loading process are selectively retrieved from data storage based on detected parameters associated with one or more of the loading container, the transport vehicle, and the material being loaded.

19. The method of claim 13, further comprising detecting relative positions and/or distances with respect to one or more points of the loading container based on received signals from the transport vehicle, and implementing the detected relative positions and/or distances for the determining the current profile of material loaded in the loading container.

20. A work machine comprising:
a frame supported by a plurality of ground engaging units;
at least one work implement supported from the frame;
at least one sensor mounted on the work machine and having a field of view oriented at least partially away there from, wherein the at least one sensor is configured to generate data corresponding to at least a portion of a loading container during a loading state of the work machine;
an onboard display unit; and
a controller configured to
determine, via at least the generated data, a current profile of material loaded in the loading container, and
generate output signals corresponding to a difference between the current profile and a predetermined target profile for the material loaded in the loading container,
wherein the output signals comprise output signals generated to automatically control at least a portion of a loading process, and
wherein the output signals comprise output signals generated to the onboard display unit to display indicia corresponding to the current profile and the predetermined target profile, and wherein a first portion of the onboard display unit displays a first image layer corresponding to images of the loading container captured via one or more of the at least one sensor and a second portion of the onboard display unit comprises the indicia corresponding to the current profile and the predetermined target profile.

* * * * *